United States Patent Office 2,925,732
Patented Feb. 23, 1960

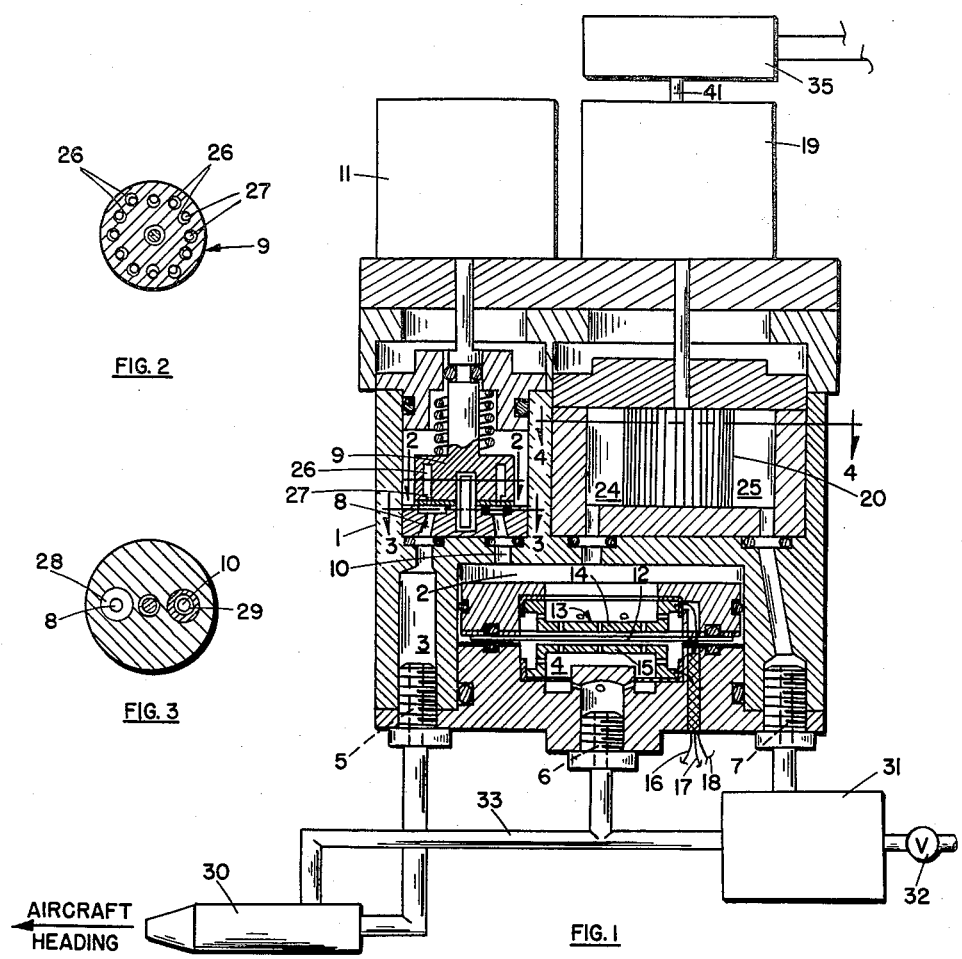
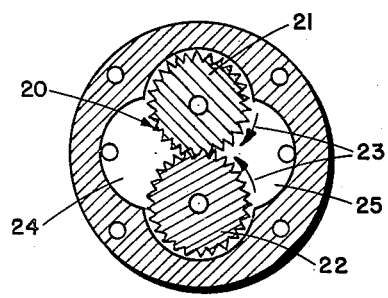
Feb. 23, 1960 — R. E. SMITH — 2,925,732
MACHMETER
Filed Dec. 27, 1955 — 2 Sheets-Sheet 1
FIG. 2
FIG. 3
FIG. 1
FIG. 4
AIRCRAFT HEADING
INVENTOR.
ROBERT E. SMITH
BY William R. Lane
ATTORNEY

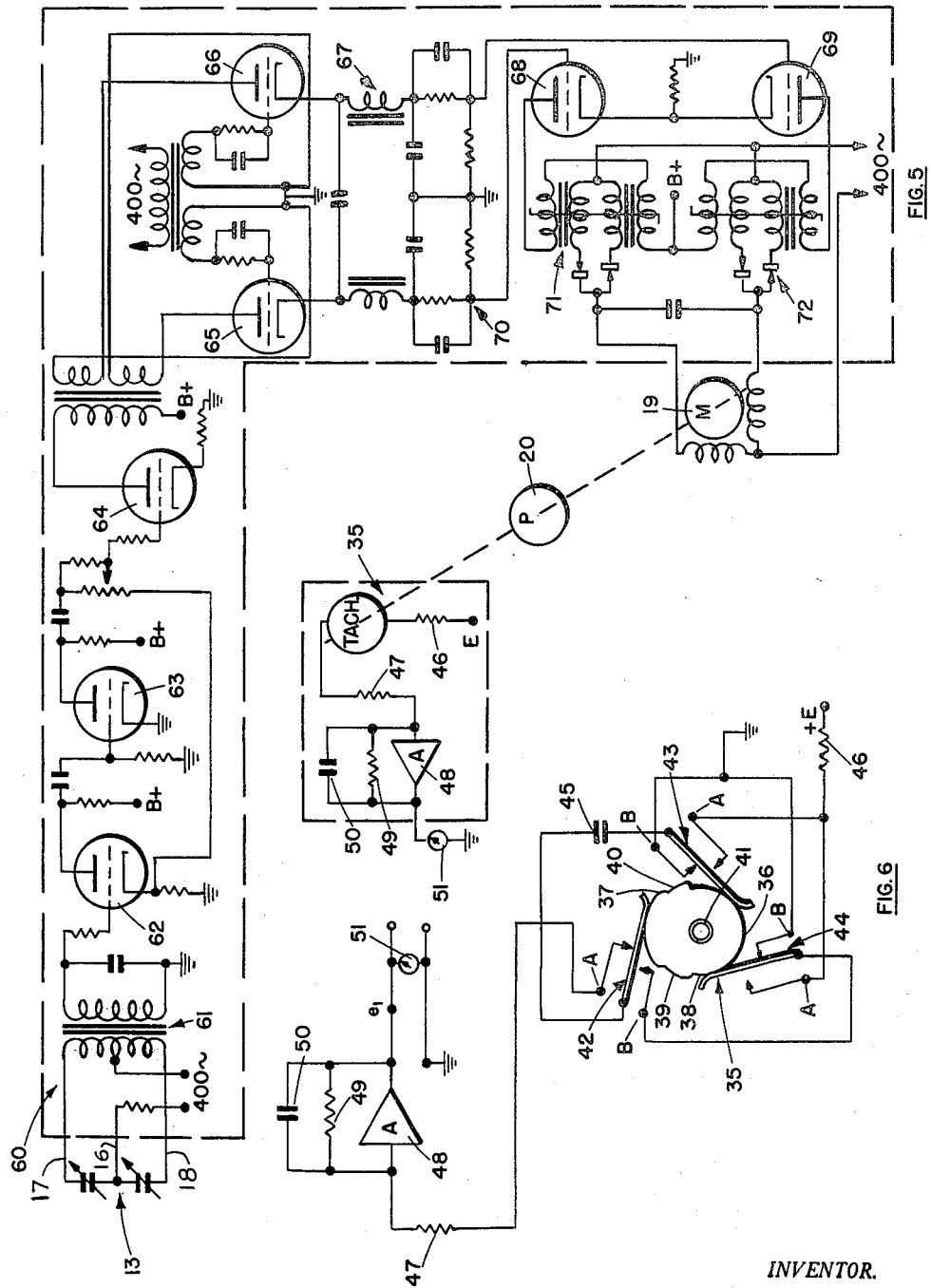

2,925,732
MACHMETER

Robert E. Smith, Downey, Calif., assignor to North American Aviation, Inc.

Application December 27, 1955, Serial No. 555,724

12 Claims. (Cl. 73—182)

This invention relates to pressure sensitive instruments and more particularly to instruments sensitive to the ratio of a pressure differential to a pressure. The invention is applicable to Machmeters and particularly to a constant flow-type Machmeter.

Machmeters are used in airplanes and missiles to measure the velocity of the aircraft relative to the surrounding air. The output of a typical Machmeter is usually expressed as some multiple of the speed of sound in air at the temperature and pressure of the surrounding atmosphere. In the past, Machmeters, particularly the supersonic variety, have generally utilized two or more pressure sensitive bellows and a fairly complicated mechanical linkage system of levers, counter weights and sector gears supported in jeweled bearings. One of the bellows is usually sensitive to the pressure differential between the total or stagnation air pressure, $P_t$, and the static air pressure, $P_s$. The other of the bellows is usually sensitive only to static air pressure, $P_s$. These Machmeters are frequently subjected to rather severe vibrations both in initial start up and in flight. It has been found that an instrument constructed in the above manner is incapable of properly functioning after being subjected to much vibration. In actual operation such instruments have been found to be inoperative after being subjected for a brief period to vibrations at 15 cycles of ½ g. magnitude. Vibrations of this magnitude are frequently encountered in high speed aircraft.

It is therefore an object of this invention to provide an improved Machmeter.

It is another object of this invention to provide a Machmeter utilizing a constant flow of fluid.

It is a further object of this invention to provide a Machmeter capable of operating under severe vibrations.

It is still another object of this invetnion to provide a Machmeter which does not require pressure sensitive bellows and their associated mechanical linkages.

A further object of this invention is to provide a Machmeter which directly indicates the true velocity of the aircraft.

Other objects of this invention will become apparent from the following description taken in connection with the accompanying drawings, in which—

Fig. 1 is a section view, partly schematic, of a preferred embodiment of the constant flow-type Machmeter contemplated by this invention;

Fig. 2 is a section view of a portion of the Machmeter of Fig. 1 taken along the line 2—2;

Fig. 3 is a section view of a portion of the Machmeter of Fig. 1 taken along the line 3—3;

Fig. 4 is a section view of a portion of the Machmeter of Fig. 1 taken along the line 4—4;

Fig. 5 is a schematic drawing of an electric circuit utilized with the Machmeter of Fig. 1;

And Fig. 6 is a schematic drawing of a typical tachometer utilized in the Machmeter of Fig. 1.

Referring now to Fig. 1, a preferred embodiment of the continuous flow-type Machmeter contemplated by this invention is shown. Casing 1 of the Machmeter encloses sealed chamber 2, stagnation air pressure chamber 3, and static air pressure chamber 4. Stagnation air pressure chamber 3 is provided with inlet port 5 which is connected to a source of stagnation air pressure such as Pitot tube 30 carried by an aircraft. Static air pressure chamber 4 is provided with inlet port 6 which is connected to a source of static air pressure such as Pitot tube 30 carried by the aircraft. Outlet port 7 of casing 1 is preferably connected to a source of pressure substantially equivalent to the static air pressure. Thus, inlet port 6 and outlet port 7 may be connected together, but preferably through buffer tank 31 which is provided with bleed-off valve 32 to prevent disturbance of the static pressure in conduit 33.

Stagnation chamber 3 is connected internally of casing 1 to sealed chamber 2 via conduit 8, metering pump 9, and conduit 10. Metering pump 9 is driven at a constant speed by synchronous motor 11. The design of metering pump 9 is such that air is conveyed between chambers 2 and 3 at a mass rate which is proportional to the pressure differential between the air in chamber 3 and the air in chamber 2. As will be described below, the pressure in chamber 2 is maintained equal to the static air pressure. Since by definition the stagnation air pressure is always higher than the static air pressure, metering pump 9 continuously conveys a small quantity of air from chamber 3 to chamber 2.

Flexible diaphragm 12 is placed between sealed chamber 2 and static chamber 4. Diaphragm 12 is preferably a frictionless aluminum alloy diaphragm which is approximately 0.0005 inch thick. Diaphragm 12 flexes in response to the pressure differential between chambers 2 and 4. The deflection of diaphragm 12 is detected by capacitive pickoff 13, which consists of stationary plates 14 and 15 and flexible diaphragm 12. Wires 16, 17 and 18 electrically connect flexible diaphragm 12 and stationary plates 14 and 15 to external circuitry, to be described later, which produces a signal output proportional to the deflection. This signal output drives servo motor 19 in a direction and at a speed which is proportional to the direction and magnitude of deflection of diaphragm 12. Servo motor 19 has a shaft output which drives gear pump 20 in a manner to convey air between chambers 2 and outlet port 7. The mass of air conveyed by gear pump 20 is proportional to the speed of rotation of gear pump 20 and to the density of the air in chamber 2. By constructing the servo system between capacitive pickoff 13 and gear pump 20 with high sensitivity, the pressure differential between chambers 2 and 4 is maintained substantially constant. As hereinafter explained, for most accurate results, this pressure differential will be maintained substantially at zero when the true freestream static pressure is connected to inlet port 6.

Referring now to Fig. 2, a section view of metering pump 9 of Fig. 1 is shown. Metering pump 9 consists of a plurality of cylindrical chambers 26 having inlet ports 27. When inlet port 27 of any particular chamber 26 is passing over enlarged chamber 28 of conduit 8, shown in detail in Fig. 3, the air in this chamber 26 acquires the pressure of the air in stagnation air pressure chamber 3. As this chamber 26 continues to rotate about the axis of pump 9, the pressure of the air trapped in chamber 26 is maintained at the stagnation air pressure. When inlet port 27 of this chamber 26 is positioned over enlarged chamber 29 of conduit 10, a small quantity of air normally is caused to flow from chamber 26 through inlet port 27 and conduit 10 into the chamber 2. At that time the air in chamber 26 acquires the same pressure as that in chamber 2. Since metering pump 9 is rotated at a constant speed by synchronized motor 11, the mass of air pumped between chambers 3 and 2 is directly proportional to the pressure differential between chambers 3 and 2.

Referring now to Fig. 4, a view of gear pump 20 of the Machmeter of Fig. 1 is shown. As gears 21 and 22 are rotated in the directions of arrows 23, small quantities of air at the pressure of chamber 24 are trapped between the gears and the pump walls and conveyed to chamber 25. It is to be noted that chamber 24 is directly connected to chamber 2. Therefore, the rotation of gear pump 20 removes a small measurable mass of air per revolution from chamber 2. As has been previously pointed out, the rate of rotation of gear pump 20 is controlled in a manner to maintain a substantially constant pressure differential between chambers 2 and 4. The air conveyed into chamber 25 by gear pump 20 is freely dissipated out outlet port 7.

The theory of operation of the constant flow-type Machmeter contemplated by this invention is as follows: Let $P_t$ and $\rho_t$ be the stagnation air pressure and density, respectively, and $P_s$ and $\rho_s$ be the static air pressure and density, respectively. If $\Delta V_1$ and $S_1$ are the volume increment per revolution and the speed of rotation, respectively, of metering pump 9, and $\Delta V_2$ and $S_2$ are the volume increment per revolution and the speed of rotation, respectively, of gear pump 20, then the mass increment of air, $\Delta m_1$, admitted to chamber 2 through metering pump 9 per time increment $\Delta t$ is $$\Delta m_1 = \Delta V_1 S_1 (\rho_t - \rho_s) \Delta t \tag{1}$$

Similarly, the mass increment of air, $\Delta m_2$, removed from chamber 2 through gear pump 20 per time increment $\Delta t$ is $$\Delta m_2 = \Delta V_2 S_2 \rho_s \Delta t \tag{2}$$

Assuming a very tight servo system for actuating gear pump 20 and either level flight or a very small volume of chamber 4 thereby making the effect of changes in static air density negligible, $$\Delta m_1 = \Delta m_2 \tag{3}$$

Combining Equations 1, 2 and 3 and solving for the speed of rotation, $S_2$, of gear pump 20, $$S_2 = \frac{\Delta V_1 S_1}{\Delta V_2} \frac{\rho_t - \rho_s}{\rho_s} \tag{4}$$

$\Delta V_1$ and $\Delta V_2$ are design constants dependent on the construction of metering pump 9 and gear pump 20, respectively, and $S_1$ is a constant due to the constant speed characteristics of synchronous motor 11. Therefore, $$S_2 = K_1 \frac{\rho_t - \rho_s}{\rho_s} \tag{5}$$

where K is a constant.

Assuming substantially uniform temperatures of the gases in chambers 2, 3, and 4, the densities, $\rho_t$ and $\rho_s$, of the air in the chambers are direct proportional to the pressures, $P_t$ and $P_s$, respectively in the chambers. Therefore, $$S_2 = K_2 \frac{P_t - P_s}{P_s} \tag{6}$$

where $K_2$ is a constant.

As is well known, the usual subsonic and supersonic expressions for the relationship between Mach number, M, and stagnation and static pressure are:

$$\frac{P_t - P_s}{P_s} = [1 + 0.2M^2]^{3.5} - 1 \quad M \leq 1.0 \tag{7}$$

and $$\frac{P_t - P_s}{P_s} = \frac{166.92 M^7}{(7M^2 - 1)^{2.5}} - 1 \quad M \geq 1.0 \tag{8}$$

Therefore, $$\frac{P_t - P_s}{P_s}$$

is equal to some function of the Mach number, M. An output signal or physical indication of $$\frac{P_t - P_s}{P_s}$$

can readily be interpreted, or calibrated to read, in terms of Mach number.

The foregoing discussion has assumed that the true free-stream static pressure is detected by Pitot tube 30. However, as is well known in the art, the indicated static pressure detected by conventional static pressure detectors differs from the true free-stream static pressure by static pressure errors caused by shock waves and misalignment of the Pitot mast with the average velocity vector. Systems have been devised for compensating for these static pressure errors, an example being described in the copending application of Frederick H. Gardner, entitled "Static Pressure Error Compensator," Serial No. 528,848, filed August 16, 1955, and assigned to the assignee of this invention. A fixed compensation for static pressure error may also be effected by the present invention by adjusting the aforementioned servo system so as to maintain a predetermined constant pressure differential (equal to the static pressure error) between chamber 2 and chamber 4, thereby in effect maintaining the pressure in chamber 4 at the true free-stream static pressure rather than the indicated static pressure. Such an adjustment may be made for example by adjusting the position of flexible diaphragm 12 so that the output signal is nulled when the desired pressure differential exists between chambers 2 and 4.

Referring now to Figs. 1 and 6, a typical capacitor tachometer having an output signal proportional to the speed of rotation, $S_2$, of the gear pump 20 is shown. Capacitor tachometer 35 produces a D.-C. voltage which is proportional to the ratio of $$\frac{P_t - P_s}{P_s}$$

and therefore is a predetermined function of the Mach number of the aircraft. Fig. 6 is a schematic drawing of tachometer 35. Insulation cam 36, having cam surfaces 37, 38, 39 and 40, is keyed to output shaft 41. Three cam-operated switches 42, 43 and 44 are positioned symmetrically around the periphery of cam 36 with their flexible lever arms riding on the cam surfaces. Surface 37 extends over an arc of 90° and actuates the flexible lever arm of each switch to make contact with a corresponding "A" terminal. Surface 38 extends over an arc of 210° and allows the flexible lever arm of each switch to make contact with the corresponding "B" terminal. Surfaces 39 and 40 extend over arcs of 30° and maintain the flexible lever arms in a neutral position making contact with neither terminal "A" nor terminal "B."

Capacitor 45 is connected between the flexible lever arms of switches 42 and 43. A source (not shown) of constant D.-C. potential, E, is connected through resistor 46 to the "A" terminals of switches 43 and 44 while the "B" terminals of switches 43 and 44 are connected to ground. The flexible lever arm of switch 44 is connected to the "B" terminal of switch 42. The "A" terminal of switch 42 is connected through resistor 47 to an integrating network consisting of amplifier 48, resistor 49 and capacitor 50. The integrating network maintains a D.-C. voltage output, $e_1$, which is the integral of a pulsed input.

In operation, capacitor tachometer 35 alternately charges capacitor 45 from the source of constant D.-C. potential, E, and discharges capacitor 45 into the integrating network. The direction of rotation of cam 36 determines the polarity of the charge on capacitor 45 at the time the camming action causes it to discharge into the integrating network. The speed of rotation of cam 36 determines the number of pulses or discharges coupled into the integrating network per unit time, thereby determining the amplitude of the output D.-C. potential, $e_1$.

The values of capacitor 45 and resistor 46 are determined by the time available to completely charge capacitor 45 to D.-C. potential E at the maximum useful angular velocity of shaft 41. The discharge circuit elements such as resistors 47 and 49 are determined by the time available to completely discharge capacitor 45 at the maximum useful angular velocity of shaft 41. Assuming the charging and discharging of capacitor 45 is complete, the D.-C. level of the output is given by $$e_1 = C_1 R_2 E S_2 \qquad (9)$$

where $C_1$ is the capacitance of capacitor 45, $R_2$ is the resistance of resistor 49 and E is the source potential.

Referring now to Fig. 5, a schematic drawing of a servo controller connected between capacitive pickoff 13 and servo motor 19 is shown. The capacitors of pickoff 13 are a part of bridge network 60. When the pressures in chambers 2 and 4 are exactly equal, bridge network 60 is balanced. When metering pump 9 conveys air into chamber 2, there is a small pressure differential between chambers 2 and 4. This pressure differential between chambers 2 and 4 causes movement of diaphragm 12 unbalancing bridge network 60. The output signal of bridge 60 appears across the secondary of transformer 61 with a magnitude and a phase which is determined by the magnitude and direction of displacement of diaphragm 12. This error signal is amplified by preamplifier tubes 62, 63 and 64. Resistance coupling is used between the tubes and a negative feedback is incorporated in the circuit in order to stabilize the gain and minimize the effect of noise introduced by stray pickup in the amplifier cicruit.

The output of the final preamplifier stage is coupled into a demodulator circuit including demodulator tubes 65 and 66 and LC filter network 67. The error signal, which is passed through the preamplifier stages, is impressed on the plates of tubes 65 and 66. Although the plates of tubes 65 and 66 are connected to vary in phase with each other, in response to this error signal the voltages applied to the grids of tubes 65 and 66 are 180° out of phase with each other. Under these conditions only one tube conducts, becoming a half-wave rectifier. The phase of the error signal determines which of tubes 65 and 66 conducts. The demodulator circuit is, therefore, essentially a phase sensitive rectifier with an LC filter and has, as an output, a D.-C. voltage which varies in magnitude with the magnitude of the error signal and has a polarity determined by the phase of the error signal. The demodulator circuit, as shown in Fig. 5, is constructed symmetrically with respect to ground to eliminate any unbalancing effect due to stray capacitances.

The output voltage of filter 67 is coupled to power amplifier tubes 68 and 69 through RC lead network 70. The leading phase shift introduced by lead network 70 compensates for the lag introduced by the inertia of the mechanical parts of the system and the delay in the demodulator and power amplified portions of the circuit. In response to the error signal, power amplifier tubes 68 and 69 provide the control for the magnetic amplifier stage. In essence, the magnetic amplifier stage remodulates the signal and provides the power necessary to drive motor 19.

When power amplifier tubes 68 and 69 are in a quiescent state, that is, when no error signals are applied to their grids, the plate currents of the tubes are sufficient to cause the control windings of self-saturating magnetic amplifiers 71 and 72 to maintain their cores in a demagnetized condition. The load windings of amplifiers 71 and 72 continuously have a very high inductive reactance, thereby drastically limiting the amount of current flowing through the windings of two-phase induction motor 19 from the source (not shown) of 400 c.p.s. voltage. Under these conditions the rotor of motor 25 does not turn.

By impressing a negative error signal on one of the grids of tubes 68 and 69, the corresponding plate current is materially reduced. Assume for the purposes of illustration, a negative signal is impressed on the grid of tube 68. The control winding of magnetic amplifier 71 does not completely demagnetize the core, and the core is saturated during some part of each positive and negative half-cycle of 400 c.p.s voltage. When the core is saturated, a large amount of current flows through the windings of motor 19. The magnitude of the error signal determines the degree of demagnetization of the core of magnetic amplifier 71 and, therefore, the speed of rotation of motor 19. By applying the negative error voltage to tube 69 instead of tube 68, the direction of rotation of motor 19 is reversed.

Motor 19 drives gear pump 20 in a direction and at a speed necessary to remove a sufficiently large mass of air from chamber 2 to maintain the pressure differential between chambers 2 and 4 substantially constant. As has been previously noted, the speed of rotation of motor 19 is an arcuate measure of the ratio $$\frac{P_t - P_s}{P_s}$$

This ratio is readily converted into a reading of Mach number by proper calibration. Thus, the dial of meter 51 of Fig. 6 can be calibrated to read directly in Mach number.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An indicator sensitive to the ratio of a pressure differential to a pressure comprising a first chamber subjected to a first fluid pressure; a second chamber subjected to a second fluid pressure; a third chamber normally sealed from said first and second chambers; means for continuously conveying fluid between said first and third chambers at a mass rate proportional to the pressure differential between said chambers; second means for conveying fluid from said third chamber at a rate to continuously maintain the fluid pressure in said third chamber substantially equal to the fluid pressure in said second chamber; and means for indicating the rate at which said second fluid conveying means conveys fluid from said third chamber.

2. A pressure differential indicator comprising a first chamber subjected to a first fluid pressure; a second chamber subjected to a second fluid pressure not greater than said first fluid pressure; a sealed third chamber; constant speed pumping means connected between said first and third chambers in a manner to continuously convey fluid from said first chamber to said third chamber at a mass rate proportional to the pressure differential between said first and third chambers; second pumping means connected to said third chamber and responsive to the pressure differential between said second and third chambers in a manner to convey fluid from said third chamber at a rate sufficient to maintain said pressure differential between said second and third chambers substantially at zero; and means for indicating the volumetric rate of fluid conveyance by said second pumping means.

3. A Machmeter comprising a sealed chamber; a pressure sensitive element responsive to the pressure differential between said chamber and the static atmosphere; servo means responsive to said sensitive element for evacuating air from said chamber to maintain said pressure differential substantially at zero; means for indicating the rate said servo means evacuates said chamber and pumping means connected to continuously convey a gas into said chamber at a mass rate proportional to the pressure differential between said chamber and the stagnation pressure.

4. A Machmeter comprising a sealed chamber containing a compressible fluid; pressure sensitive means responsive to the pressure differential between said chamber and the static atmosphere; servo means responsive to said pressure sensitive means for changing the amount of compressible fluid in said chamber to maintain said pressure differential constant; means responsive to said servo means for indicating the rate at which said servo means changes the amount of compressible fluid in said chamber; and means connected to convey a compressible fluid into said chamber at a mass rate proportional to the pressure differential between said chamber and the stagnation pressure.

5. A Machmeter as recited in claim 4 in which said servo means includes a constant volume displacement pump connected to said sealed chamber and a servo controller connected to actuate said pump to change the amount of compressible fluid in said chamber in response to said pressure sensitive means to maintain said pressure differential substantially constant.

6. A Machmeter as recited in claim 4 in which said fluid conveying means includes a chamber subjected to the stagnation pressure, and a constant speed pump connected to convey compressible fluid from said stagnation pressure chamber to said sealed chamber at a mass rate proportional to the pressure differential between said chambers.

7. A Machmeter for measuring the velocity of an object in air comprising a first chamber; means subjecting said first chamber to the stagnation pressure; a second chamber; means subjecting said second chamber to the static atmosphere; a sealed chamber; pumping means connected to convey air from said first chamber to said sealed chamber at a mass rate proportional to the pressure differential between said first chamber and said sealed chamber; pressure sensitive means responsive to the pressure differential between said sealed chamber and said second chamber; displacement means coupled to said sealed chamber and responsive to said pressure sensitive means in a manner to maintain said pressure differential between said sealed chamber and said second chamber substantially at zero by conveying air out of said sealed chamber; and means responsive to said displacement means for indicating the rate at which said displacement means conveys air out of said sealed chamber whereby said rate of said displacement means is a measure of the velocity of said object in air.

8. A Machmeter for measuring the velocity of an object in air comprising a sealed chamber; duct means open to the atmosphere in a manner to be continuously subjected to the static atmospheric pressure surrounding said object; second duct means open to the atmosphere in a manner to be continuously subjected to the stagnation pressure of said object measured along the heading of said object; pumping means connected to convey air into said sealed chamber at a preselected mass rate proportional to the pressure differential between said sealed chamber and said second duct means; pressure sensitive means subjected to the pressure differential between said sealed chamber and said first-named duct means; displacement means connected to convey air from said sealed chamber; means for indicating the volumetric rate of conveyance of said air from said sealed chamber; and a servo controller responsive to said pressure sensitive means and connected to actuate said displacement means to maintain said pressure sensitive means in equilibrium whereby the volumetric rate of conveyance of said air from said sealed chamber by said displacement means is an accurate measure of the velocity of said object in air.

9. A Machmeter for accurately measuring the velocity of an aircraft comprising a casing attached to said aircraft; a first chamber in said casing; a second chamber in said casing; a gas tight chamber in said casing; conduit means subjecting said first chamber to the stagnation pressure measured in the direction of heading of said aircraft; conduit means subjecting said second chamber to the static atmosphere; constant speed metering means connected between said sealed chamber and said first chamber in a manner to continuously convey air into said sealed chamber at a preselected mass rate proportional to the pressure differential between said sealed chamber and said first chamber; a constant volume displacement air gear pump connected to remove air from said sealed chamber at a volumetric rate proportional to the angular velocity of said gear pump; a flexible diaphragm positioned to flex in response to the pressure differential between said sealed chamber and said second chamber; capacitive pick-off means sensitive to the flexure of said diaphragm; servo means responsive to the unbalance of said pick-off means and having an output shaft coupled to drive said air gear pump at an angular velocity sufficient to convey air from said sealed chamber in a manner to maintain said pressure differential between said sealed chamber and said second chamber at a constant value and means for indicating the angular velocity of said gear pump whereby said angular velocity of said gear pump is proportional to the velocity of said aircraft.

10. A Machmeter as recited in claim 9 in which said indicating means includes a tachometer operatively connected to said output shaft and having a signal output proportional to the angular velocity of said output shaft.

11. An indicator for indicating the ratio of a pressure differential between two sources of fluid pressure to a pressure of one of said sources of fluid pressure comprising a chamber; metering means connected to convey fluid between the other of said fluid pressure sources and said chamber at a preselected mass rate proportional to the pressure differential between said chamber and said other fluid pressure source; a pressure sensitive element responsive to the pressure differential between said chamber and said one fluid pressure source; servo means responsive to said pressure sensitive element and connected to evacuate fluid from said chamber in a manner to maintain the pressure differential between said chamber and said one fluid pressure source substantially constant; and means for indicating the rate of evacuating the fluid from said chamber by said servo means.

12. A flow-type Machmeter for accurately measuring the velocity of an aircraft comprising a casing attached to said aircraft; a gas tight chamber in said casing; another chamber in said casing; inlet means subjecting said other chamber to the static atmosphere; metering means connected between said gas tight chamber and a source of stagnation pressure of the atmosphere to convey air into said gas tight chamber at a preselected mass rate determined by the magnitude of the pressure differential between said gas tight chamber and the stagnation atmosphere; an outlet duct to said gas tight chamber; a constant volume air displacement pump positioned in said outlet duct to regulate the flow of air through said duct; a flexible diaphragm positioned to flex in response to the pressure differential between said chambers; capacitive pick-off means sensitive to the flexure of said diaphragm; servo means responsive to the unbalance of said pick-off means and having a shaft output coupled to drive said air displacement pump in said outlet duct to regulate the flow of air through said outlet duct in a manner to maintain said pressure differential between said chambers at a constant value; and means for indicating the speed of displacement of said air displacement pump.

References Cited in the file of this patent

UNITED STATES PATENTS 2,508,623     Schaefer _____ May 23, 1950
2,592,176     Orlin et al. _____ Apr. 8, 1952

UNITED STATES PATENT OFFICE

CERTIFICATE OF CORRECTION

February 23, 1960

Patent No. 2,925,732

Robert E. Smith

It is hereby certified that error appears in the printed specification of the above numbered patent requiring correction and that the said Letters Patent should read as corrected below.

Column 5, line 58, for "amplified" read -- amplifier --; column 6, line 21, for "arcuate" read -- accurate --.

Signed and sealed this 23rd day of August 1960.

(SEAL)
Attest:

KARL H. AXLINE
Attesting Officer

ROBERT C. WATSON
Commissioner of Patents